UNITED STATES PATENT OFFICE.

CYRIL E. FRANCHE, OF CHICAGO, ILLINOIS.

COMPOSITION FOR AND PROCESS OF COATING ELECTRIC-LIGHT BULBS.

1,259,505.

Specification of Letters Patent.    Patented Mar. 19, 1918.

No Drawing.    Application filed July 12, 1915. Serial No. 39,373.

*To all whom it may concern:*

Be it known that I, CYRIL E. FRANCHE, a citizen of the United States, residing at Chicago, in the county of Cook and State of Illinois, have invented certain new and useful Improvements in Compositions for and Processes of Coating Electric-Light Bulbs, of which the following is a specification.

This invention relates to colored electric light bulbs, and process of coloring them and a composition of matter which is particularly adapted for use as a coloring coating for electric light bulbs, or the like.

Electric light bulbs, such as are used in electric signs and the like, have hitherto been constructed of inherently colored glass, or the bulbs have been colored or painted by dipping them in a coloring mixture composed of alcohol, shellac gums, and anilin dyes. This latter method of coloring the bulbs has been found very unsatisfactory, in that the colored coating fades, chips, and peels off, and becomes very unsightly, especially when exposed to the weather. The former method is known to shorten the life of the lamp, because it confines the heat, and that method is also very expensive.

An object of my invention is to provide a novel colored electric light bulb and an improved process for coloring electric light bulbs.

A further object of this invention is to provide an improved composition of matter adapted for the above described use, which will very perfectly withstand exposure to the weather, and other hard and continued usage, without cracking, chipping off, peeling, or fading to any noticeable extent. Other advantages will appear hereinafter.

This improved composition of matter comprises a suitable oil, such as linseed oil, china oil, soyabean oil, or the like, which is boiled and mixed in a heated condition with a suitable gum resin, such as kauri, dammar, copal, or the like, which has been previously melted, the mixture being of such proportions as to produce the desired consistency, as is well known in the art of varnish making, for instance. After the above ingredients have been thoroughly mixed and cooled, I add thereto a further ingredient which I term a thinning agent. This thinning agent may be turpentine, benzin, gasolene, amyl acetate, or other suitable amyl compound or hydrocarbon, which is added to the mixture in the proportion of approximately one or two parts of the thinning agent to seven or six parts of the oil resin mixture. A suitable coloring or tinting agent is then added to the above mixture in the proportion of from five to twenty-four ounces to one gallon of the mixture. This coloring agent preferably consists of a suitable mixture of an oil and a resin with lamp black or a pigment, such as vermilion, or the like. Or the coloring agent may be a composition of virgin wax, dry white soap, tallow or lard, shellac, mastic, and lamp black. After thoroughly mixing the coloring agent with the other elements the improved composition is completed, when it is ready for use in coloring electric light bulbs, for instance, which is done by dipping them into the composition, and then permitting them to dry for a suitable period of time, preferably two or three days, before they are used.

My improved composition of matter may be conveniently formed from commercial products by adding a thinning agent, such as turpentine, benzin, gasolene, amyl acetate, or the like, to an oil varnish, preferably in the proportion of one part of the thinning agent to seven parts of the varnish. The varnish and thinning agent are mixed when cold, and to each gallon of the resulting mixture there is added from five to twenty-four ounces of either printers' ink or lithographic ink. The amount of ink added depends upon the color thereof, and upon the intensity of coloring which it is desired to impart to the compound. By "printers' ink" and "lithographic ink" I refer to the commercial products or compositions comprising generally boiled oil and pigments as the main constituents. A translucent ink is preferably used, since the resulting composition more readily permits the light rays to shine through the light bulb and thereby produce a more brilliant effect.

This improved composition of matter has the advantage of relatively low cost, in addition to those previously pointed out, and it is found in practice that when this composition is used for coating electric light bulbs, the coating will have a life equal to or exceeding that of the electric light itself, without chipping or peeling, or otherwise becoming defective. This composition also more readily permits the radiation and conduction of heat than inherently colored lamps (*i. e.*, lamps made of glass which is colored before or while being blown) used for the same purpose, and thus the life of the filament within the bulb is prolonged.

Although I have described my improved composition of matter as being composed of particular ingredients combined in certain proportions, it will be understood that I contemplate the substitution of equivalents, and changes in the relative proportion of the different ingredients, without departing from the scope of the invention, and that my invention comprises the composition of the various ingredients and their equivalents as described and claimed, as well as the composition of the commercial products herein described. It will be understood that the invention is defined in the appended claims.

I claim:—

1. A composition for applying to incandescent lamp bulbs a permanent colored translucent coating consisting of oil, a resin, a thinning agent, and a pigment.

2. An electric light bulb having on the exterior surface a colored translucent coating formed of an oil body and a coloring ingredient.

3. The process of imparting to an electric light bulb a predetermined color which consists in dipping the bulb into a solution comprising an oil base and a coloring ingredient, and drying into a permanent coating the film of said solution which adheres to the exterior surface of the bulb.

4. A composition for applying to incandescent lamp bulbs a colored coating comprising seven pints of a mixture of linseed oil and a resin, one pint of a thinning agent, and five to twenty-four ounces by weight of a coloring agent containing a pigment.

5. A composition of matter for applying to incandescent lamp bulbs a permanent colored coating consisting of oil varnish, turpentine, and translucent printers' or lithographic ink.

6. A composition of matter for applying to incandescent lamp bulbs a colored coating comprising seven pints of oil varnish, one pint of turpentine, and five to twenty-four ounces by weight of printers' ink.

7. A composition of matter for applying to incandescent lamp bulbs a colored coating comprising seven pints of oil varnish, one pint of a thinning agent, and five to twenty-four ounces by weight of a coloring agent containing a pigment.

8. A composition of matter for applying to incandescent lamp bulbs a permanent colored coating consisting of seven pints of oil varnish, one pint of a thinning agent, and a relatively small quantity of a coloring agent containing a pigment.

In testimony whereof, I have subscribed my name.

CYRIL E. FRANCHE.